Jan. 29, 1924.

A. L. DONOGH 1,481,991

CULTIVATOR

Filed Dec. 14, 1921      2 Sheets-Sheet 1

A. L. Donogh INVENTOR.

BY Egerton R. Case ATTORNEY.

Jan. 29, 1924. 1,481,991
A. L. DONOGH
CULTIVATOR
Filed Dec. 14, 1921   2 Sheets-Sheet 2

A. L. Donogh INVENTOR.

BY
Egerton N. Case ATTORNEY.

Patented Jan. 29, 1924.

1,481,991

UNITED STATES PATENT OFFICE.

ANDREW LEE DONOGH, OF GRISWOLD, MANITOBA, CANADA.

CULTIVATOR.

Application filed December 14, 1921. Serial No. 522,421.

*To all whom it may concern:*

Be it known that I, ANDREW LEE DONOGH, a subject of the King of Great Britain, residing at Griswold, Province of Manitoba, Canada, have invented certain new and useful Improvements in Cultivators, of which the following is a specification.

My invention relates to improvements in cultivators, and the principal object of my invention is to provide what is known as a self-cleaning cultivator, wherein the teeth move slowly towards the rear end of the implement as the same advances, and which gradually invert so that wet earth, and grass, and roots collected thereby while in the soil will drop therefrom. Another object of my invention is to adapt my implement so that the working depth of the teeth in the ground can be regulated. A disclosure within my invention comprises a suitable frame provided with a suitable draft-gear; this frame is adjustably suspended from the axle of the carrying wheels, by lever mechanism under the control of the operator to adjust the height of said frame to determine the depth of the ground cultivated. Mounted on shafts held in bearings carried by said frame are wheels with which is associated drive belts, and these drive belts carry supporting members preferably in the shape of bars, to which are coupled the tines or teeth. Means is associated with each of the said supporting members which hold the teeth or tines in operative position in co-action with a certain part of the frame of the implement, as hereinafter more particularly set forth.

Figure 1:
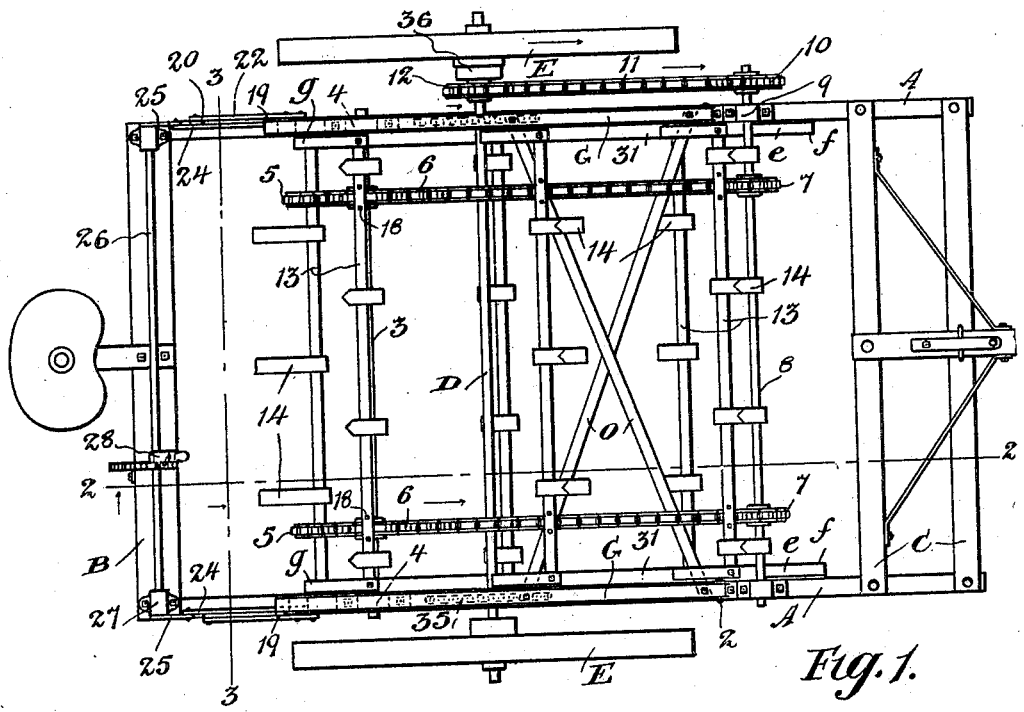
Figure 2:
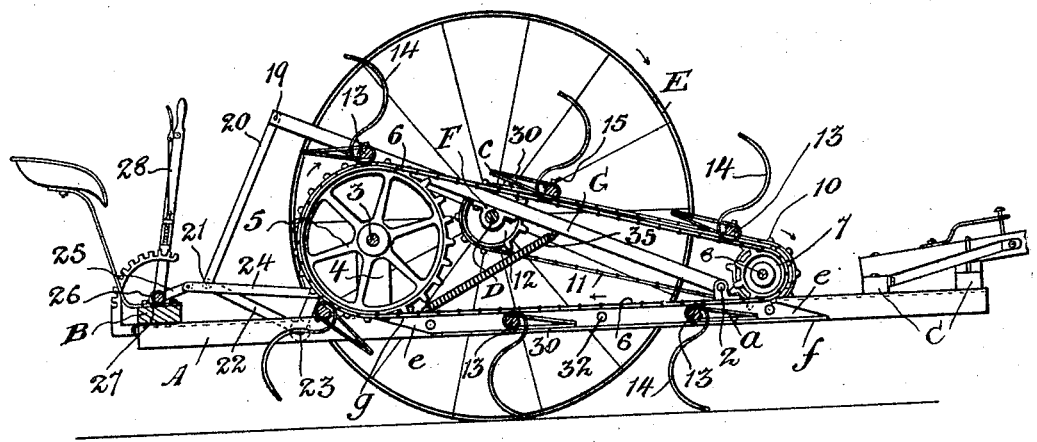
Figure 3:
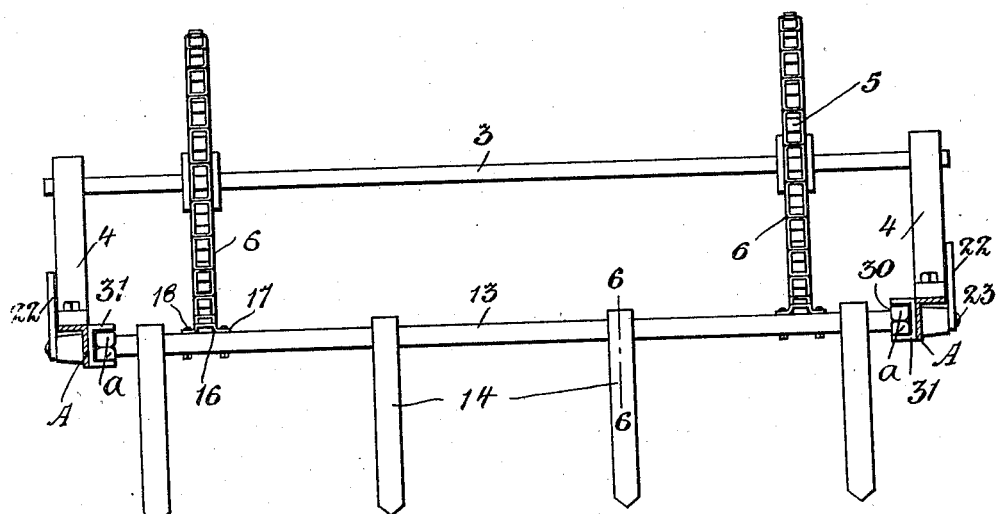
Figure 4:
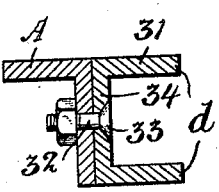
Figure 6:
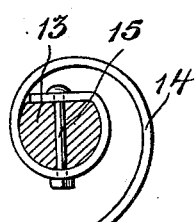
Figure 5:
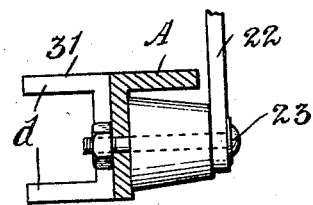
Figure 7:
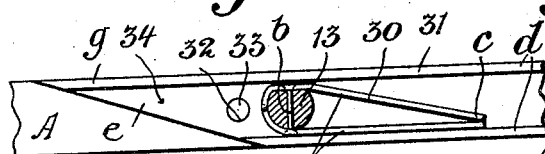

Fig. 1 is a plan view of an implement within my invention, and Fig. 2 is in part a longitudinal vertical section on the line 2—2, Fig. 1, with certain parts omitted for the purpose of clearness in illustrating. Fig. 3 is a vertical cross-section on the line 3—3, Fig. 1. Figs. 4 and 5 are cross sectional details through the frame of the implement showing certain details of construction. Fig. 6 is a section on the line 6—6, Fig. 3, showing a suitable manner of attaching the teeth or tines to their supporting members, and Fig. 7 is a sectional detail showing in side elevation the preferred form of keeper carried by the supporting members for the teeth or tines co-acting with a track carried by the frame of the implement, to hold said teeth in operative position.

In the drawings, like characters of reference refer to the same parts.

The frame of the implement may be of any desired construction and in the disclosure shown the same comprises longitudinal members A preferably made of angle iron, tied together by the cross members B and C. The shaft D of the carrying wheels E is journalled in suitable boxes F carried by the bars G which are suitably hinged as shown at 2 at their lower ends to the longitudinal members A. A shaft 3 is journalled in the standards 4 which are carried by the members A. Mounted on said shaft are a pair of wheels 5, with each of which co-acts a drive belt 6 which passes over wheels 7 keyed to a shaft 8 journalled in the bearings 9 carried by the longitudinal members A. The shaft 8 also carries a wheel 10 over which passes a drive belt 11 which passes over a wheel 12 associated with the shaft D. The wheels 5 and 7, 10 and 12 are preferably sprocket wheels, and the drive belts co-acting therewith are preferably sprocket chains.

Suitably coupled to the drive belts 6 and extending transversely of the frame of the implement are supporting members 13, preferably in the form of bars, to which are suitably coupled the teeth or tines 14, as by means of rivets or bolts 15 (see Fig. 6) or in any other suitable manner. Any suitable means may be employed to couple the supporting members 13 to the drive belts 6. For instance, I may make use of special links 16 provided with ears 17 through which pass bolts 18 whereby the links 16 are coupled to the supporting members 13.

The bars G have hinged to their upper ends as at 19 links 20 which are pivoted as at 21 to the bell-crank levers 22 which are pivoted to the members A as at 23 (Fig. 5). The links 24 are pivoted at one end to a bell-crank lever 22 and at the other end each to its associated arm 25 at each end of the rock-shaft 26, which rock-shaft is mounted in bearings 27 suitably carried by the frame of the implement. The lever 28 is keyed to the rock-shaft 26. When the operator desires to regulate the distance the teeth or tines 14 extend into the ground, by means of the levers 28 and the link mechanism before-described, coupled to the bars G, he can secure the desired adjustments. By means of the bars G and means whereby the same is coupled to the frame of the implement, the frame of the implement is suspended from the shaft D.

There is a bell-crank lever 22 at each side of the implement frame, with which is associated the links before-mentioned, and when the operator pulls the lever 28 towards himself, the frame of the implement is lifted, and when said lever is moved in the opposite direction the frame of the implement is lowered.

By following the direction of the arrows particularly in Fig. 2, it will be observed that the drive belts 6 will slowly carry the tines or teeth 14 rearwardly of the implement as the same advances; in other words, the gearing is so arranged that each tooth or tine 14 moves backward much more slowly than the rate of advance of the implement frame, and the result is that each tooth or tine remains in the ground while the implement frame travels forward approximately forty feet. It will be observed that the teeth or tines 14 are in alignment longitudinally of the implement with their fellows on the supporting members 13, and the result is that before any given tooth or tine is lifted out of the ground the next succeeding aligned tooth or tine will enter the ground and the result is that a continuous furrow will be made.

In order to prevent the resistance of the ground moving the teeth or tines 14 out of operative position, I preferably couple to each end of each supporting member or bar 13 what I call a keeper 30. This keeper may be made in various ways, though I prefer to make it of two plates $a$ which are riveted as at $b$, to the members 13. The plates $a$ converge as shown at $c$. Coupled to the inner side of each longitudinal member A is a track 31, preferably U-shaped in cross-section, and upon referring particularly to Figs. 2 and 7, it will be seen that by reason of the co-action of the keepers 30 with the flanges $d$ of the track 31, the supporting members or bars 13 are limited in axial movement.

Each end of each track 31 is cut off at an angle so as to in effect form a mouth $e$ with under shot and over shot lips $f$ and $g$, respectively, so as to permit of the ready entry and exit of the keepers 30 in respect of the channel formed between the flanges $d$.

The diameter of the wheels 5 will be such as to permit the teeth or tines 14 to leave the ground without causing the keepers 30 to bind in the tracks 31 and must be always considerably greater than the diameter of the wheels 7.

The tracks 31 are suitably secured to the longitudinal members A, in my preferred form of construction, by means of the bolts 32 the heads 33 of which are countersunk in the web 34 of said tracks; thus the extreme ends of the members or bars 13 will not be obstructed in their movement.

The springs 35 are coupled at one end to the longitudinal members A, and at the other end to the bars G. These springs assist the lever 28 in raising the frame of the implement.

If desired a suitable clutch 36 may be used on the shaft D.

It will be self-evident that the tines or teeth 14 will be freed of material collected thereby, after they have passed out of the ground.

The bars G may be braced or tied together by any suitable means such as braces O, (Fig. 1). For clearness of illustration, the illustration of these braces has been omitted in Fig. 2.

While I have described what I consider to be the best embodiment within my invention, it must be understood that the principle may be embodied in other forms, and I desire not to be limited beyond the requirements of the prior art and the terms of my claims.

What I claim is:

1. In a cultivator, in combination a frame; a drive shaft positioned above the same; traction wheels mounted on said shaft; means functionally intermediate said shaft and said frame whereby said frame is adjustably supported by said shaft; two shafts supported by said frame thereabove; two wheels mounted on each of the said shafts; drive belts co-operating with said wheels mounted on said second-mentioned shafts and passing around said drive shaft; a plurality of teeth carried by each of the said drive belts, and means circulating with said drive belts and associated with said teeth and adapted to co-act with said frame to maintain said teeth in operative position.

2. In a cultivator, in combination a frame; a drive shaft positioned above the same; traction wheels mounted on said shaft; means functionally intermediate said shaft and said frame whereby said frame is adjustably supported by said shaft; two shafts supported by said frame thereabove; two wheels mounted on each of the said shafts; drive belts co-operating with said wheels mounted on said second-mentioned shafts and passing around said drive shaft; a plurality of supporting members carried by said drive belts and extending transversely of said frame; a plurality of teeth carried by each of the said supporting members, and means circulating with said supporting members and adapted to co-act with said frame to maintain said teeth in operative position.

3. In a cultivator, in combination a frame; a drive shaft positioned above the same; traction wheels mounted on said shaft; means functionally intermediate said shaft and said frame whereby said frame is adjustably supported by said shaft; two shafts supported by said frame thereabove; two wheels mounted on each of the said shafts; drive belts co-operating with said wheels mounted on said second-mentioned shafts and passing around said drive shaft; a plurality of teeth carried by each of the said drive belts; keepers associated with said teeth, and a track carried by each side of said frame with which said keepers co-act as said teeth travel to the rear end of said implement in order to keep them in operative position.

4. In a cultivator, in combination a frame; a shaft positioned above the same; wheels mounted on said shaft; means functionally intermediate said shaft and said frame whereby said frame is adjustably supported by said shaft; two shafts supported by said frame; two wheels mounted on each of the said shafts; drive belts co-operating with said wheels mounted on said second-mentioned shaft; a plurality of supporting members carried by said drive belts transversely of said frame; a plurality of teeth carried by each of the said supporting members; a keeper carried by said supporting members, at each end, and flanged tracks associated with said frame at each side thereof through which said keepers pass as said teeth travel to the rearward in order to maintain them in operative position.

5. In a cultivator, in combination a suitable frame; front and rear shafts above the same carried thereby, the front shaft adapted to be driven by any suitable means; a pair of wheels mounted on each of the said shafts, the diameter of the wheels on the said rear shaft being considerably greater than that of the wheels on said front shaft and in alignment; drive belts co-acting with said wheels to convey movement from the front shaft to the rear shaft; harrow teeth carried by said drive belts to circulate therewith, and means circulating with said drive belts and adapted to co-act with said frame as said teeth are moved towards the rear end of said implement in order to maintain them in operative position.

6. In a cultivator, in combination a suitable frame provided at each side with a channel-shaped track, the ends of which are cut off at a sloping angle, so as to provide at the front end an under projection, and at the rear end an upper projection; front and rear shafts carried by said frame, the front shaft adapted to be driven by any suitable means; a pair of wheels mounted on each of the said shafts, and in alignment; drive belts co-acting with said wheels to convey movement from the front shaft to the rear shaft; harrow teeth carried by said drive belts to circulate therewith, and means circulating with said drive belts and adapted to co-act with said tracks in order to maintain said teeth in operative position.

7. In a cultivator, in combination a suitable frame provided at each side with a channel-shaped track, the ends of which are cut off at a sloping angle, so as to provide at the front end an under projection, and at the rear end an upper projection; front and rear shafts carried by said frame, the front shaft adapted to be driven by any suitable means; a pair of wheels mounted on each of the said shafts, and in alignment; drive belts co-acting with said wheels to convey movement from the front shaft to the rear shaft; a plurality of supporting members extending transversely of said frame and each provided with a plurality of harrow teeth, the ends of said members adapted to operate through said tracks, and a pair of converging plates carried by each end of said members and adapted to enter said tracks and to co-act therewith to form keepers so as to limit axial movement of said members in order to maintain said teeth in operative position.

8. In a cultivator, in combination a suitable frame provided at each side with a channel-shaped track, the ends of which are cut off at a sloping angle, so as to provide at the front end an under projection, and at the rear end an upper projection; front and rear shafts carried by said frame, the front shaft adapted to be driven by any suitable means; a pair of wheels mounted on each of the said shafts, and in alignment, the wheels on the rear shaft being of equal diameter and of considerably greater diameter than the wheels on the front shaft; drive belts co-acting with said wheels to convey movement from the front shaft to the rear shaft; a plurality of supporting members extending transversely of said frame and each provided with a plurality of harrow teeth, the ends of said members adapted to operate through said tracks, and a pair of converging plates carried by each end of said members and adapted to enter said tracks and to co-act therewith to form keepers so as to limit axial movement of said members in order to maintain said teeth in operative position.

ANDREW LEE DONOGH.